United States Patent [19]

Barker et al.

[11] Patent Number: 5,871,865
[45] Date of Patent: Feb. 16, 1999

[54] METHODS OF FABRICATING ELECTROCHEMICAL CELLS

[75] Inventors: Jeremy Barker; Steven Cochran, both of Henderson, Nev.

[73] Assignee: Valence Technology, Inc., Henderson, Nev.

[21] Appl. No.: 857,025

[22] Filed: May 15, 1997

[51] Int. Cl.⁶ .................................................. H01M 10/40
[52] U.S. Cl. .................... 429/223; 429/224; 29/623.1; 29/623.2; 205/59
[58] Field of Search ..................................... 429/162, 163, 429/212, 217, 223, 224, 218, 249, 185; 29/623.1, 623.2; 205/59; 320/4, 13, 14

[56] References Cited

U.S. PATENT DOCUMENTS

| | | |
|---|---|---|
| 5,436,549 | 7/1995 | Lundquist et al. . |
| 5,500,583 | 3/1996 | Buckley et al. . |
| 5,599,435 | 2/1997 | Li et al. ..................................... 205/59 |
| 5,601,623 | 2/1997 | Fauteux et al. ......................... 29/623.1 |

OTHER PUBLICATIONS

Barker, J., *Electrochimica Acta*, V. 40, No. 11, 1995, pp. 1603–1608 (No Month).

Juzkow et al., *Proceedings of the Third Annual Portable by Design Conference*, Mar. 1996, pp. 13–22.

*Primary Examiner*—Anthony Skapars

[57] ABSTRACT

Conditioning secondary lithium ion cells at elevated temperatures above ambient reduces the time required to complete this process and produces cells and batteries which demonstrate improved electrochemical performance. Conditioning includes subjecting an electrochemical cell to at least one full charge/discharge cycle whereby gases generated and removed before the cell is sealed and ready for use.

21 Claims, 2 Drawing Sheets

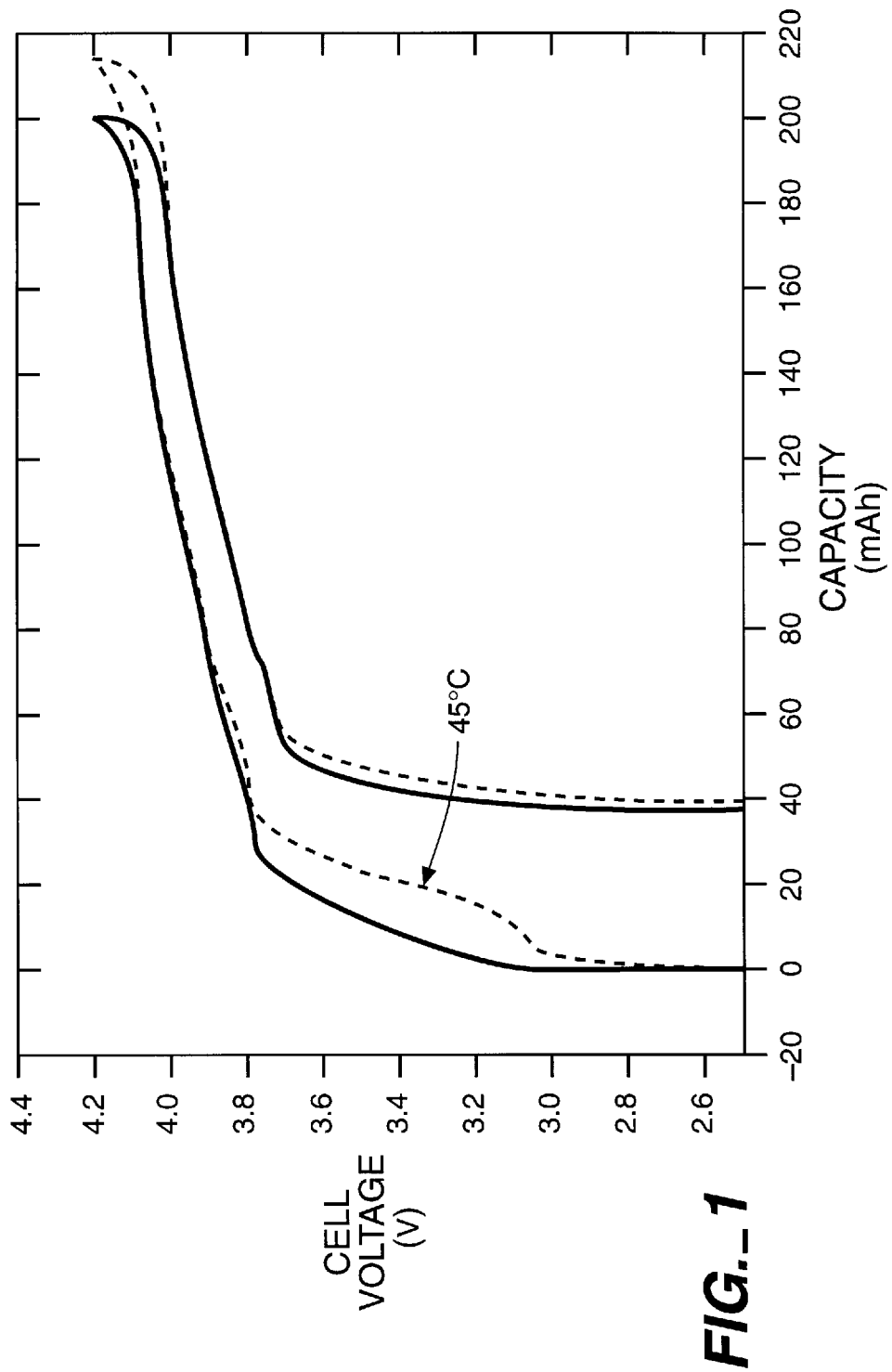
FIG._1

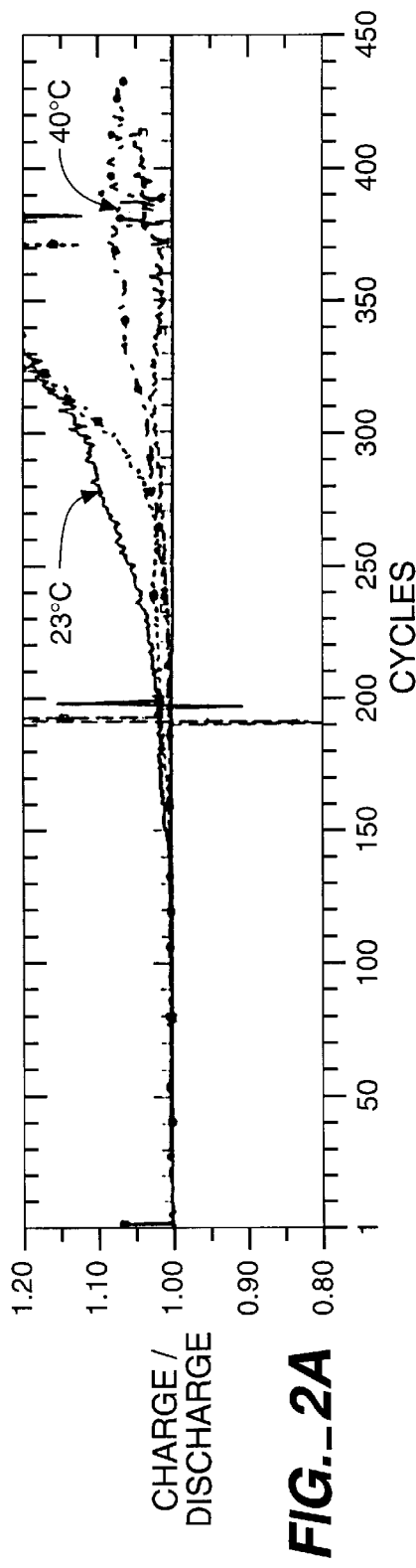
FIG._2A
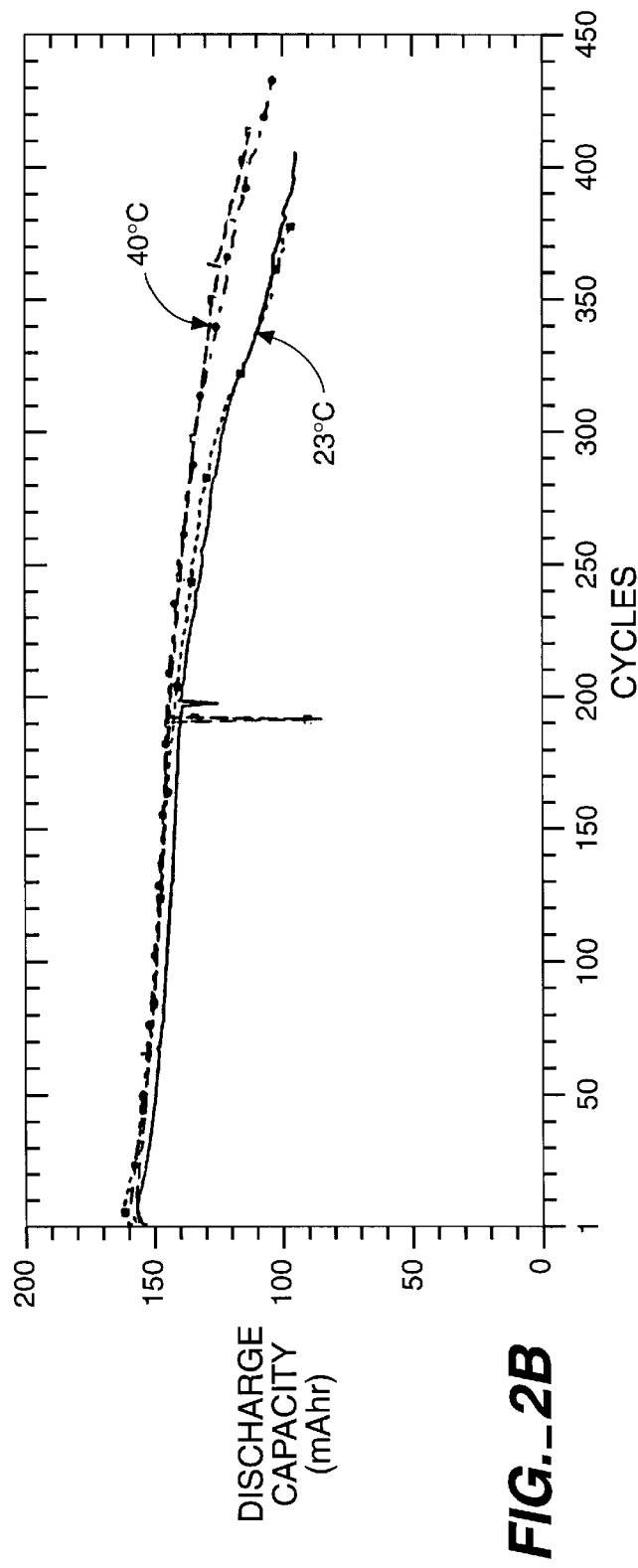
FIG._2B

METHODS OF FABRICATING ELECTROCHEMICAL CELLS

FIELD OF THE INVENTION

The present invention is directed to electrochemical devices and, more particularly to methods of fabricating a secondary lithium ion battery whereby the battery is conditioned (i.e., charged and discharged) at elevated temperatures prior to being packaged and sealed for immediate use or storage. The battery produces gases during the condition process which are removed.

BACKGROUND OF THE INVENTION

Electrochemical cells comprise a cathode, an anode and an electrolyte interposed therebetween. The electrochemical cells are often defined as liquid or solid cells and this refers merely to whether the electrolyte interposed between the anode and the cathode is a liquid or a solid. Solid electrochemical cells are well known in the art and present many advantages over conventional liquid batteries such as improved safety features, lighter weight, etc. Non-aqueous lithium electrochemical cells are discussed in U.S. Pat. Nos. 4,472,487, 4,668,595, 5,028,500, 5,441,830, 5,460,904, and 5,540,741.

The anode comprises a compatible anodic material which is any material which functions as an anode in an electrochemical cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like. The cathode comprises a compatible cathodic material which refers to any material which functions as a positive pole (cathode) in an electrochemical cell. Such compatible cathodic materials are well known in the art and include, by way of example, manganese dioxide, molybdenum trioxide, sulfides of titanium and niobium, chromium oxide, copper oxide, vanadium oxides such as $V_2O_5$, $V_6O_{13}$, $LiV_3O_8$ and the like. The particular compatible cathodic material employed is not critical. When the electrochemical cell is a secondary cell, then the compatible cathodic material employed is one which is capable of being recharged (e.g., $LiV_3O_8$, $V_6O_{13}$, $MoO_3$, and the like).

Composite electrode refers to cathodes and anodes wherein the cathode includes materials in addition to compatible cathodic materials and the anode includes materials in addition to compatible anodic materials. Typically, the composite electrode contains a polymer which acts to bind the composite materials together and an electrolytic solvent. Composite electrodes are well known in the art. For example, a composite cathode can comprise a compatible cathodic material, a conductive material, an electrolytic solvent, an alkali salt, and a solid matrix forming polymer. Similarly, for example, a composite anode can comprise a compatible intercalation anodic material, an electrolyte solvent and a solid matrix forming polymer.

Secondary lithium ion cells and batteries employing composite electrodes are typically fabricated in the discharged state which means that the anode comprises intercalation carbon materials and the cathode comprises a suitable lithiated cathodic material, e.g., lithiated manganese oxide. Prior to use, the cell must be charged with external energy so that lithium ions from the cathodic material are intercalated into the carbon material of the anode. It has been found that during the initial charge/discharge cycles the cell generates a considerable amount of gases. These gases would be entrapped in the cell unless they are removed by a conditioning process prior to sealing the package encasing the cell.

SUMMARY OF THE INVENTION

The present invention is based, in part, on the discovery that conditioning secondary lithium ion cells at elevated temperatures reduces the time required to complete this process. Specifically, the inventive process improves the efficiency at which gas is produced and removed from the cells. In addition, this process produces cells and batteries which demonstrate improved electrochemical performance.

In one aspect, the invention is directed to a method of preparing an electrochemical cell the includes the steps of:
(a) fabricating an electrochemical cell in the discharged state which comprises (i) an anode comprising an intercalation based carbon material, an (ii) a cathode comprising a lithiated cathodic material, and (iii) a polymeric matrix interposed between the anode and cathode which comprises an electrolyte solvent and salt;
(b) placing the electrochemical cell in an environment that is maintained at an elevated temperature;
(c) charging and discharging the electrochemical cell;
(d) removing gas that is generated by the electrochemical cell in step (c); and
(e) sealing the electrochemical cell.

In another aspect, the invention is directed to a method of preparing an electrochemical cell that includes the steps of:
(a) preparing an anode precursor by forming an anode film comprising an anodic material, a first polymeric binder, and a first plasticizer and thereafter removing said first plasticizer;
(b) preparing a cathode precursor by forming a cathode film comprising a cathodic material, a second polymeric binder and thereafter removing said third plasticizer;
(c) positioning a polymer electrolyte precursor between said anode film and said cathode film to form an electrochemical cell precursor and activating the electrochemical cell precursor to form an electrochemical cell;
(d) placing the electrochemical cell in an environment that is maintained at an elevated temperature;
(e) charging and discharging the electrochemical cell;
(f) removing gas that is generated from the electrochemical cell in step (e); and
(g) sealing the electrochemical cell.

In a further aspect, the invention is directed to a method of preparing an electrochemical cell that includes the steps of:
(a) forming an anode film comprising an anodic material, a polymeric matrix and a first plasticizer;
(b) forming a cathode film comprising a cathodic material, a polymeric binder and a second plasticizer;
(c) forming a polymeric layer comprising a third plasticizer;
(d) interposing said polymeric layer between said anode film and said cathode film;
(e) removing said plasticizers to form an electrochemical cell precursor;
(f) activation said electrochemical cell precursor to form an electrochemical cell;

(g) charging and discharging the electrochemical cell while the electrochemical cell is maintained at an elevated temperature;

(h) removing gas that is generated from the electrochemical cell during step (f); and (i) sealing the electrochemical cell.

Preferably, the elevated temperature ranges from about 25° C. to about 80° C.

BRIEF DESCRIPTION OF THE DRAWINGS

FIG. 1 is a first cycle EVS voltage for electrochemical cells.

FIGS. 2A and 2B are graphs of coulombic efficiency vs. cycle and discharge capacity vs. cycle, respectively, for electrochemical cells.

DETAILED DESCRIPTION OF THE PREFERRED EMBODIMENTS OF THE INVENTION

The present invention is directed to methods of preparing electrochemical devices, and particularly to processes for fabricating batteries. Preferred electrochemical cells include: a composite cathode comprising an active material and polymeric binder, a composite anode comprising an intercalation based carbon anode and polymeric binder, with each electrode capable of reversibly incorporating (e.g., intercalating) an alkali metal ion, and an electrolyte comprising a polymeric matrix containing an electrolyte solution comprising an organic electrolyte solvent and a salt of the alkali metal. Particularly preferred electrochemical cells and batteries use lithium and salts thereof.

The anode generally comprises an anode film that is laminated onto one or both sides of the current collector. Similarly, the cathode comprises a cathode film that is laminated onto one or both sides of the current collector. The current collectors comprise, for example, a screen, grid, expanded metal, foil, woven or non-woven fabric or knitted wire formed from an electron conductive material such as metals or metal alloys.

A critical aspect of the present invention is that during fabrication, the electrochemical cell or battery is subject to a conditioning cycling process whereby gases are released. After removal of these gases, the electrochemical cell or battery is sealed for immediate use or storage. This conditioning process takes place at an elevated temperature which reduces the number of cycles required to release and remove the gas. In addition, conditioning at elevated temperatures improves cell performance, notably cycling, elevated temperature storage, ambient temperature storage and reduction of secondary gassing. Secondary gassing is defined as residual gassing in a cell after the cell has been conditioned, degassed, and then re-sealed. This phenomenon is believed to arise from the small amount of residual moisture or other impurities left in the cell following condition.

The conditioning process comprises at least one charge/discharge cycle after the electrochemical cell or battery is assembled in the discharged state. The number of cycles employed is not critical although the number should be sufficient to produce enough gas so that after the cell or battery is sealed, no significant secondary gassing occurs. Generally, during the conditioning process, the amount of gas produced decreases with each cycle. Typically, by conditioning at elevated temperatures, only 1–2 cycles are required. The conditioning can also terminate at a charged state. In a preferred embodiment, conditioning comprises one complete charge/discharge cycle followed by a final charge half cycle. As is apparent, after conditioning at least one full cycle, the conditioning can then terminate at any state between compete charge and compete discharge.

Conditioning is generally conducted at an elevated temperature that is higher than ambient that typically ranges from about 25° C. to 80° C., more preferably 30° C. to 60° C., and most preferably 35° C. to 50° C. and is otherwise accomplished by conventional methods. Conventional charging schemes can be employed including, for example, constant current/constant voltage and pulsed current. A preferred technique is a constant current, limited charge to an upper voltage followed by a constant voltage charge, terminated either by time and/or minimum charge current value, which is described in the Proceeding of the Third Annual Portable by Design Conference, 1996, pp 13–22 (Penton Publishing). The electrochemical cell is typically charged (or recharged) at about 1 mA per $cm^2$. Similarly, the electrochemical cell is discharged at about 1 mA per $cm^2$. These rates will depend on a number of factors including, for example, cell chemistry and the anode/cathode mass ratio. It should be noted that the enhanced kinetics effected by the elevated temperatures mean that a higher mA per $cm^2$ charge/discharge rate could be used (e.g., about 3 mA per $cm^2$). This reduces the time required for conditioning. With the inventive technique, the charge and discharge current densities could be about 4 mA per $cm^2$ or higher.

A secondary lithium ion electrochemical cell having a graphite anode and $Li_xMnO_4$ cathode material typically has an initial charged potential of at least about 4.2 volts and discharge is generally continued until the potential of the cell is reduced by about 3.0 volts. The voltage limits will vary depending, for example, on the particular anode and/or cathode active materials. As is apparent, batteries will have different initial changed potential depending on the number of cells and how the cells are arranged. With the inventive technique, the charge and discharge current can be as high as about 4 mA per $cm^2$.

However, prior to describing this invention in further detail, the following terms will be defined.

The term "cycle" refers to a combined charge one-half cycle and a discharge one-half cycle, whereby the cell or battery takes in and stores electrical energy in a charge one-half cycle and releases electrical energy in a discharge one-half cycle.

The term "charge capacity" refers to the maximum charge measured in ampere hours, which the cell or battery fabricated by the inventive technique is capable of achieving under the charging conditions and procedures.

The term "cycle life" is the number of cycles undergone by the cell under charging conditions and procedures and repeatedly discharged under standard test conditions and procedures, until the charge capacity of the cell or battery has fallen to one-half the charge capacity.

The term "initial charge capacity" refers to the charge capacity of a fresh cell or battery which is fabricated by the inventive technique.

The term "standard cycle life" is the number cycles undergone by a fresh cell or battery which is repeatedly slowly charged at a constant low current and repeatedly discharged under standard test conditions and procedures, until the charge capacity of the cell or battery falls to one-half the initial charge capacity.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, acetates, glymes, and low molecular weight polymers.

In operation, in fabricating a solid polymeric matrix or composite electrode that includes polymeric binders, for example, the plasticizer is first well mixed with a polymer. Preferably the weight ratio of plasticizer to polymer in this mixture is from about 0.1 to about 50, more preferably about 0.5 to about 25, and most preferably about 1 to about 10. Thereafter the plasticizer is removed by extraction and in the process the porous structure is formed.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from organic polymers, inorganic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

Preferably, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiCl_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. For example, the organic carbonate can be non-cyclic carbonates or cyclic aliphatic carbonates. Non-cyclic carbonates include, for example, dimethyl carbonate, diethyl carbonate, methyl ethyl carbonate, dipropyl carbonate and bis(2-methoxyethyl) carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 (wt) % and more preferably at about 2.5 (wt) % based on the total weight of the electrolyte composition.

The term "substrate" refers to any suitable film made of material that is compatible with the components of the polymer mixture. The substrate serves as the vehicle or base onto which the electrode mixture is applied. After the solvent has evaporated from the mixture, the polymer matrix is formed. As is apparent, the electrode mixture is applied onto the surface of the polymer matrix that is not attached to the substrate. Suitable substrates include, for example, paper, e.g, 20 or 24 weight paper, polyester (MYLAR™), polypropylene, polyethylene films and non-woven webs.

The term "current collector" refers to any suitable metallic current collector. Current collectors in the form of grids are preferred. Each current collector is also preferably connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. No. 4,925,752, 5,011,501, and 5,326,653, which are incorporated herein.

The composite anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), (including copolymers thereof), EAA (ethylene acrylic acid copolymer), EVA (ethylene vinyl acetate copolymer), EAA/EVA copolymers, and the like.

Composite anodes preferably comprise a carbon material and a polymeric binder which preferably comprises polymers such as, for example, polyvinylidene difluoride, halogenated hydrocarbon polymers including, for example, poly (vinylidene chloride), poly((dichloro-1,4-phenylene) ethylene), fluorinated urethanes, fluorinated epoxides, fluorinated acrylics, and copolymers thereof. Porous polymer structures are formed when these polymers are first imbued with the plasticizers and then removing the plasticizers therefrom. The composite anode can comprise from about 5% (wt) to about 50% (wt) preferably from about 8% (wt) to about 30% (wt) and more preferably from about 10% (wt) to about 20% (wt) of the polymeric binders. Graphite is a preferred carbon material. The composite anode may also include an electron conducting material such as carbon black.

The composite cathode preferably comprises a compatible cathodic material (i.e., insertion compounds) which is any material which functions as a positive pole in a solid electrolytic cell. Such compatible cathodic materials are well known in the art and include, by way of example, transition metal oxide materials, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ ($0\leq y<1$) that has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the composite cathode is prepared from a composite cathode paste which comprises from about 35 to 65 (wt) % of a compatible cathodic material; from about 1 to 20 (wt) % of an electroconductive agent; from about 1 to 20 (wt) % of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. Preferably, the composite cathode can comprise from about 3% (wt) to about 50% (wt), preferably from about 8% (wt) to about 30% (wt), and more preferably from about 10% (wt) to about 20% (wt) of the polymeric binder.

The composite cathode further comprises from about 0 to about 20 (wt) % of polyethylene oxide having a number average molecular (wt) of at least 100,000; from about 10 to 50 (wt) % of solvent comprising a 10:1 to 1:4 (w/w) mixture of an organic carbonate and a glyme; and from about 5 (wt) % to about 25 (wt) % of a sold matrix forming monomer or partial polymer thereof. An ion conducting amount of an inorganic ion salt may also be included. Generally, the amount of the salt is from about 1 to about 25 (wt) %. (All (wt) % are based on the total weight of the cathode.)

The electrolyte composition typically comprises from about 5 to about 25 (wt) % of the inorganic ion salt based on the total weight of the electrolyte; preferably, from about 10 to 20 (wt) %; and even more preferably from about 10 to about 15 (wt) %. The percentage of salt depends on the type of salt and electrolyte solvent employed.

The electrolyte composition typically comprises from 0 to about 80 (wt) % electrolyte solvent based on the total weight of the electrolyte; preferably from about 60 to about 80 (wt) %; and even more preferably about 70 (wt) %.

A solid electrolyte composition typically comprises from about 5 to about 30 (wt) % of the solid polymeric matrix based on the total weight of the electrolyte; preferably from about 15 to about 25 (wt) %.

In a preferred embodiment, the solid electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 (wt) % and more preferably at about 2.5 (wt) % based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, 5,028,500, 5,584,893, and U.S. patent application Ser. No. 08/630,985 entitled "Method and Apparatus For Preparing Electrochemical Cells" filed Apr. 12, 1996, all of which are incorporated herein. The inventive method can be adapted to prepare prior art electrochemical devices.

During the conditioning process, conventional charge/ discharge cycling techniques are employed. For secondary lithium ion cells or batteries comprising graphite/$Li_xMn_2O_4$ active materials with a mass balance of $Li_xMn_2O_4$:graphite of about 2.9:1, the charging step preferably comprises charging the freshly assembled electrochemical cell or battery at a rate of from about 0.25 to about 3 mA per $cm^2$, more preferably from about 1 to about 2 mA per $cm^2$ and maintaining this rate until the potential of the cell or battery increases to 4.2 volts. In a preferred method, the regime comprises (1) constant current charge of 1 mA per $cm^2$ to 4.2 V, (2) constant potential float of 4.2 V until current falls to 0.1 mA per $cm^2$, and (3) constant current discharge at 1 mA per $cm^2$ to 3.0 V. Selection of the specific parameters for charge/discharge during conditioning can be readily determined by the skilled artisan based on this disclosure.

The following examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

EXAMPLE 1

The anode slurry is prepared as follows: A polymer mixture comprising a copolymer of vinylidene difluoride (VDF) and hexafluoropropylene (HFP) is prepared by mixing 23.3 grams of the copolymer in 100 ml of acetone. The copolymer (ave. melt viscosity 23,000–27,000 poise) is Kynar Flex 2801™ from Elf Atochem North America, Philadelphia, Pa. The mixture is stirred for about 24 hours in a milling jar available from VWR Scientific, San Francisco, Calif., catalogue No. H-04172-00. The copolymer functions as a binder for the carbon in the anode.

A graphite mixture is prepared separately by first adding 80 grams of graphite into 3.1 grams of carbon black into a solution containing 200 grams acetone, 36 grams dibutyl phthalate. A preferred graphite is a natural graphite available as BG35 from Superior Graphite Co., Chicago, Ill. A preferred carbon black is available under the designation Super P™ from M.M.M. Carbon, Willbroeck, Belgium. The graphite mixture is then vigorously mixed in a high shear mixer until a substantially homogeneous blend is formed. A suitable mixer is available from Ross, Model ME100DLX, Hauppauge, N.Y. operating at a high setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was laminated onto a current collector comprising a sheet of expanded copper metal. An anode film forms when the remaining portion of the acetone evaporates.

EXAMPLE 2

The cathode slurry is prepared as follows: A polymer mixture comprising a copolymer of vinylidene difluoride (VDF) and hexafluoropropylene (HFP) is prepared by mixing 26.7 grams of the copolymer in 100 grams of acetone. The copolymer is Kynar Flex 2801™. The mixture is stirred for about 24 hours in a milling jar.

A cathode active material mixture is prepared separately by first adding 173.4 grams of a cathode-active material of $Li_xMn_2O_4$ (spinel) ($0<x\leq2$), 14.7 grams of carbon black (Super P™) into a solution containing 333.3 grams acetone, 51.9 grams dibutyl phthalate. The mixture is then vigorously mixed in the a high shear mixer until a substantially homogeneous blend is formed.

A cathode slurry is prepared by mixing the polymer mixture and the cathode active material mixture together under low shear conditions to form the cathode slurry wherein the components are well mixed. A portion of the acetone is allowed to evaporate from the slurry before it is laminated onto a current collector comprising a sheet of expanded aluminum. A cathode film forms when the remaining portion of the acetone evaporates.

EXAMPLE 3

A solid electrochemical cell precursor is prepared by positioning a polymeric matrix between the anode and cathode and thereafter laminating the structures under moderate pressure and/or temperature (e.g., 130° C.). The lamination causes the polymeric matrix to fuse or anneal with the binding materials of the anode and cathode. The pressure and temperature employed will depend on the polymer(s) forming the matrix. The polymeric matrix is formed by casting a slurry comprising acetone, dibutyl phthalate, silanized fumed $SiO_2$, and a VDF/HFP copolymer onto a carrier web or other substrate and allowing the acetone to evaporate. No curing by radiation is required. Preferably, the slurry is mixed under low shear conditions as not to degrade the copolymer. the anode, cathode, and separator films can be prepared separately or each can be fabricated in the form of a long web and stored as individual rolls. Each web can be cut to size as needed. Next the dibutyl phthalate is removed (e.s. by extraction) from the precursor or plurality of electrochemical cell precursors in the case of a battery.

Following removal of the dibutyl phthalate, the precursor is then pre-packaged in moisture-impermeable material which is described, for example, in U.S. Pat. No. 5,326,653 which is incorporated herein. By pre-package is meant that the packaging material is not completely sealed so that gases generated by the cell can be removed. The packaging material employed is any suitable electrically insulating, moisture impermeable or resistant material such as plastics. Packaging (or final sealing) can be accomplished by conventional means including, for example, with adhesives or by shrink-wrapping. At least portions of the anode and cathode tabs remain exposed and extend past the exterior surface of the packaging material even after sealing. The pre-packaged precursor is then activated preferably in an inert (e.g., argon) atmosphere. Next, the electrochemical cell is subject to the conditioning process whereby gases produced by the cell during charge/discharge is removed. In one preferred embodiment, the package containing the electrochemical cell has two interconnected chambers. One chamber houses the cell, and the second chamber is empty. During the conditioning process, the electrochemical cell is heated to an elevated temperature. Gas produced during the cycling process enters the second chamber which is made of flexible, expandable material. After the conditioning process, the conduit connecting the two chambers is severed, leaving two separate packages, one of which contains the cell. The package containing the cell is sealed and is ready for immediate use or storage.

It should be noted that removing 100% of the moisture and other volatile impurities by the charge/discharge cycle during conditioning is unlikely, so some residual will remain thereby causing secondary gassing. Nevertheless, the elevated temperature improves the kinetics for all reactions including those associated with gas evolution.

In addition, with the present invention, the cell can be conditioned at higher charge/discharge rates, e.g., 3–5 mA per $cm^2$ along with the elevated temperatures to further reduce the conditioning time required.

In another embodiment, the pre-packaged cell is placed into a vacuum chamber which also contains a heating device, e.g. resistive heater. During the conditioning process, gases are continuously removed by a vacuum pump. After the conditioning process, the package is sealed.

EXPERIMENTAL

Electrochemical cells fabricated generally in accordance with the procedures described in Examples 1–3 were conditioned at 23° C. and 45° C. The charge/discharge/charge regime comprised: (1) constant current charge of 1 mA per $cm^2$ to 4.2 V, (2) constant potential float of 4.2 V until current falls to 0.1 mA per $cm^2$, and (3) constant current discharge at 1 mA per $cm^2$ to 3.0 V.

The comparative Electrochemical Voltage Spectroscopy (EVS) voltage profile data for the two sets of cells conditioned at 23° C. and 45° C. are shown in FIG. 1. EVS is a low rate, high resolution technique for characterizing cell performance. For the data shown in FIG. 1, the complete charge and discharge cycle took about 40 hours to complete. The data presented are for the first charge/discharge cycle. EVS techniques are further discussed in J. Barker, Electrochimica Acta, Vol. 40, No. 11 (1995) 1603–08. As is apparent, there is a clear difference between the initial voltage responses recorded at the different temperatures. The 45° C. profile shows increased irreversible charge consumption (i.e, voltage plateau) around the 3.0–3.2 V range during the charging process. This excess charge consumption does not, however, result in an increased first cycle % inefficiency. Indeed the cells that were conditioned at 45° C. actually gave a lower first cycle % loss than those conditioned at ambient temperature.

The 3.2 V voltage plateau is normally associated with creation of the passivation layer on the graphitic anode material and thus the increased charge consumption reflects creation of a more substantial electrode-electrolyte interface. This, then, may be expected to allow for improved cycling and temperature storage behavior. The additional charge consumption around 3.2 V may also reflect a more efficient gas generation mechanism and hence reduce secondary gassing in these cells.

Additional electrochemical cells fabricated generally in accordance with the procedures described in Examples 1–3 were conditioned at 23 ° C. and 40° C. The same charge/discharge regime was employed.

FIGS. 2A and 2B depict the recharge ratio and capacity respectively vs. cycles for these latter sets of electrochemical cells. The cycling at 23° C. at employed the following regime: Charge at 2 mA per $cm^2$ until the voltage was equal to 4.2 V, then the voltage is held at constant until the current dropped to <0.2 mA per $cm^2$. Discharge at 2 mA per $cm^2$ until the voltage was equal to 3.0 V.

As is apparent, conditioning at elevated temperatures produced cells having improved columbic efficiency and improved discharge capacity retention with cycle number. Also, the cells conditioned at 23° C. showed significant secondary gassing during cycling whereas the 40° C. cells showed no secondary gassing because of the improved efficiency of the gas evolving reactions.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrochemical cell that comprises the steps of:
   (a) fabricating an electrochemical cell in the discharged state which comprises (i) an anode comprising an intercalation based carbon material, an (ii) a cathode comprising a lithiated cathodic material, and (iii) a polymeric matrix interposed between the anode and cathode which comprises an electrolyte solvent and salt;

(b) placing the electrochemical cell in an environment that is maintained at an elevated temperature;

(c) charging and discharging the electrochemical cell;

(d) removing gas that is generated by the electrochemical cell in step (c); and (e) sealing the electrochemical cell.

2. The method of claim 1 wherein the elevated temperature ranges from about 25° C. to about 80° C.

3. The method of claim 1 wherein steps (c) and (d) are repeated at least one additional time before step (e).

4. The method of claim 1 wherein said polymeric matrix and said first and second polymeric binders comprise a copolymer of vinylidenedifluoride and hexafluoropropylene.

5. The method of claim 1 wherein said lithiated cathodic material comprises lithiated cobalt anode, lithiated manganese anode, lithiated nickel anode mixtures thereof.

6. The method of claim 1 wherein, the charging is conducted at a rate of from about 1 to 4 mA per $cm^2$ and discharging is conducted at a rate of from about 1 to 4 mA per $cm^2$.

7. The method of claim 1 wherein the discharging step is accomplished by an external electrical connection between the anode to the cathode.

8. The method of claim 1 wherein the anode includes an anode current collector that has an anode tab and the cathode includes a cathode current collector that has a cathode tab, wherein step (e) comprises surrounding the electrochemical cell with packaging material to form a package wherein at least a portion of the anode tab and at least a portion of the cathode tab extends past an exterior surface of the packaging material.

9. The method of claim 1 wherein step (e) comprises sealing the electrochemical cell with electrically insulating and moisture resistant material.

10. A method of preparing an electrochemical cell that comprises the steps of:

(a) preparing an anode precursor by forming an anode film comprising an anodic material, a first polymeric binder, and a first plasticizer and thereafter removing said first plasticizer;

(b) preparing a cathode precursor by forming a cathode film comprising a cathodic material, a second polymeric binder and thereafter removing said third plasticizer;

(c) positioning a polymer electrolyte precursor between said anode film and said cathode film to form an electrochemical cell precursor and activating the electrochemical cell precursor to form an electrochemical cell;

(d) placing the electrochemical cell in an environment that is maintained at an elevated temperature;

(e) charging and discharging the electrochemical cell;

(f) removing gas that is generated from the electrochemical cell in step (e); and (g) sealing the electrochemical cell.

11. The method of claim 10 further comprising the step of laminating said polymeric electrolyte precursor to said anode film and to said cathode film prior to step (d).

12. The method of claim 10 wherein the elevated temperature ranges from about 25° C. to about 80° C.

13. The method of claim 10 wherein steps (e) and (f) are repeated at least one additional time before step (g).

14. The method of claim 10 wherein, the charging is conducted at a rate of from about 1 to 4 mA per $cm^2$ and discharging is conducted at a rate of from about 1 to 4 mA per $cm^2$.

15. A method of preparing an electrochemical cell that comprises the steps of:

(a) forming an anode film comprising an anodic material, a polymeric matrix and a first plasticizer;

(b) forming a cathode film comprising a cathodic material, a polymeric binder and a second plasticizer;

(c) forming a polymeric layer comprising a third plasticizer;

(d) interposing said polymeric layer between said anode film and said cathode film;

(e) removing said plasticizers to form an electrochemical cell precursor;

(f) activating said electrochemical cell precursor to form an electrochemical cell;

(g) charging and discharging the electrochemical cell while the electrochemical cell is maintained at an elevated temperature;

(h) removing gas that is generated from the electrochemical cell during step (f); and (i) sealing the electrochemical cell.

16. The method of claim 15 further comprising the step of fusing said polymeric layer to said anode film and to said cathode film prior to step (e).

17. The method of claim 15 wherein steps (g) and (h) are repeated at least one additional time before step (i).

18. The method of claim 15 wherein, the charging is conducted at a rate of from about 1 to 4 mA per $cm^2$ and discharging is conducted at a rate of from about 1 to 4 mA per $cm^2$.

19. An electrochemical cell fabricated by a process as defined in claim 1.

20. An electrochemical cell fabricated by a process as defined in claim 10.

21. An electrochemical cell fabricated by a process as defined in claim 15.

* * * * *